(No Model.) 2 Sheets—Sheet 1.
W. ANDERSON.
APPARATUS FOR PURIFYING WATER.
No. 444,772. Patented Jan. 13, 1891.
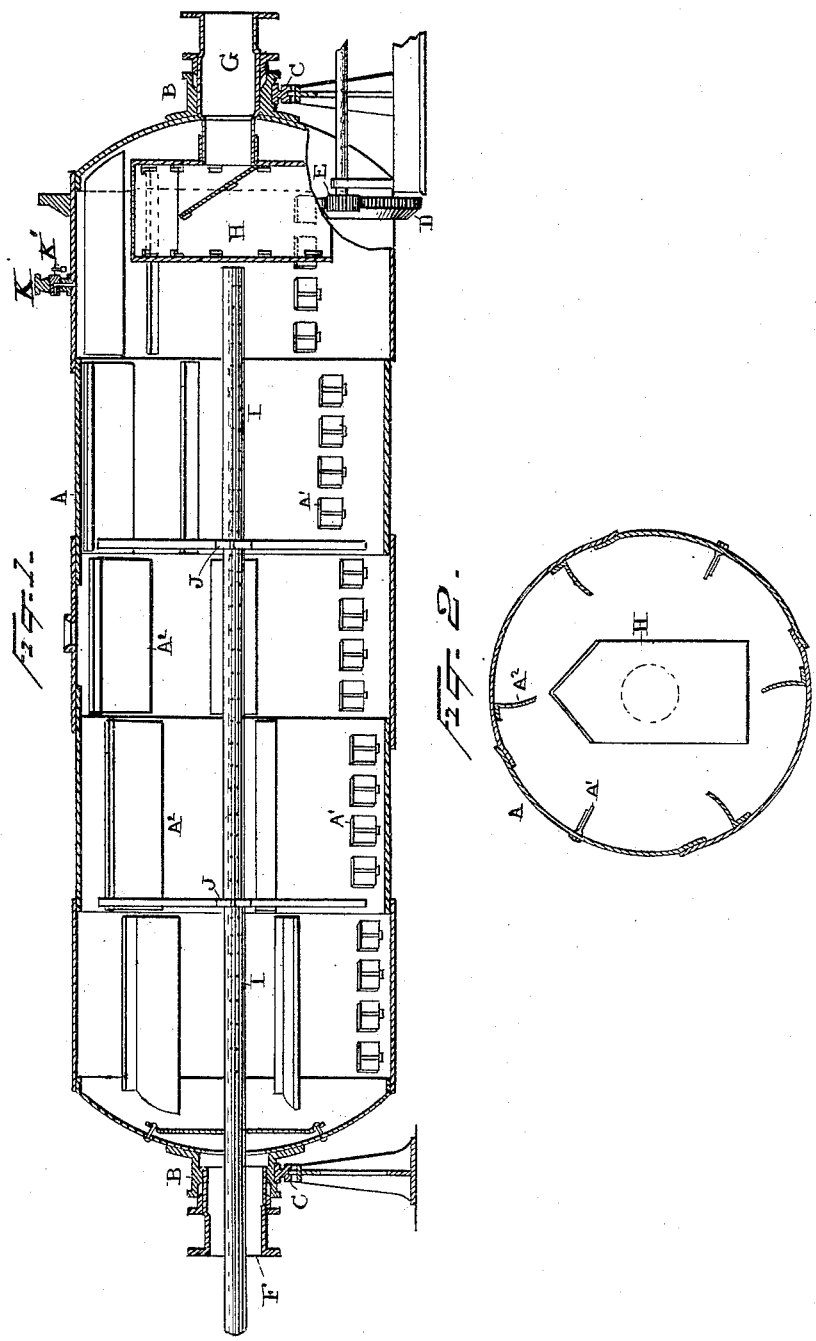
Witnesses
Norris H. Clark
Charles M. Catlin
Inventor
Wm. Anderson,
By his Attorneys.
Dyer & Seely.

(No Model.) 2 Sheets—Sheet 2.
W. ANDERSON.
APPARATUS FOR PURIFYING WATER.
No. 444,772. Patented Jan. 13, 1891.
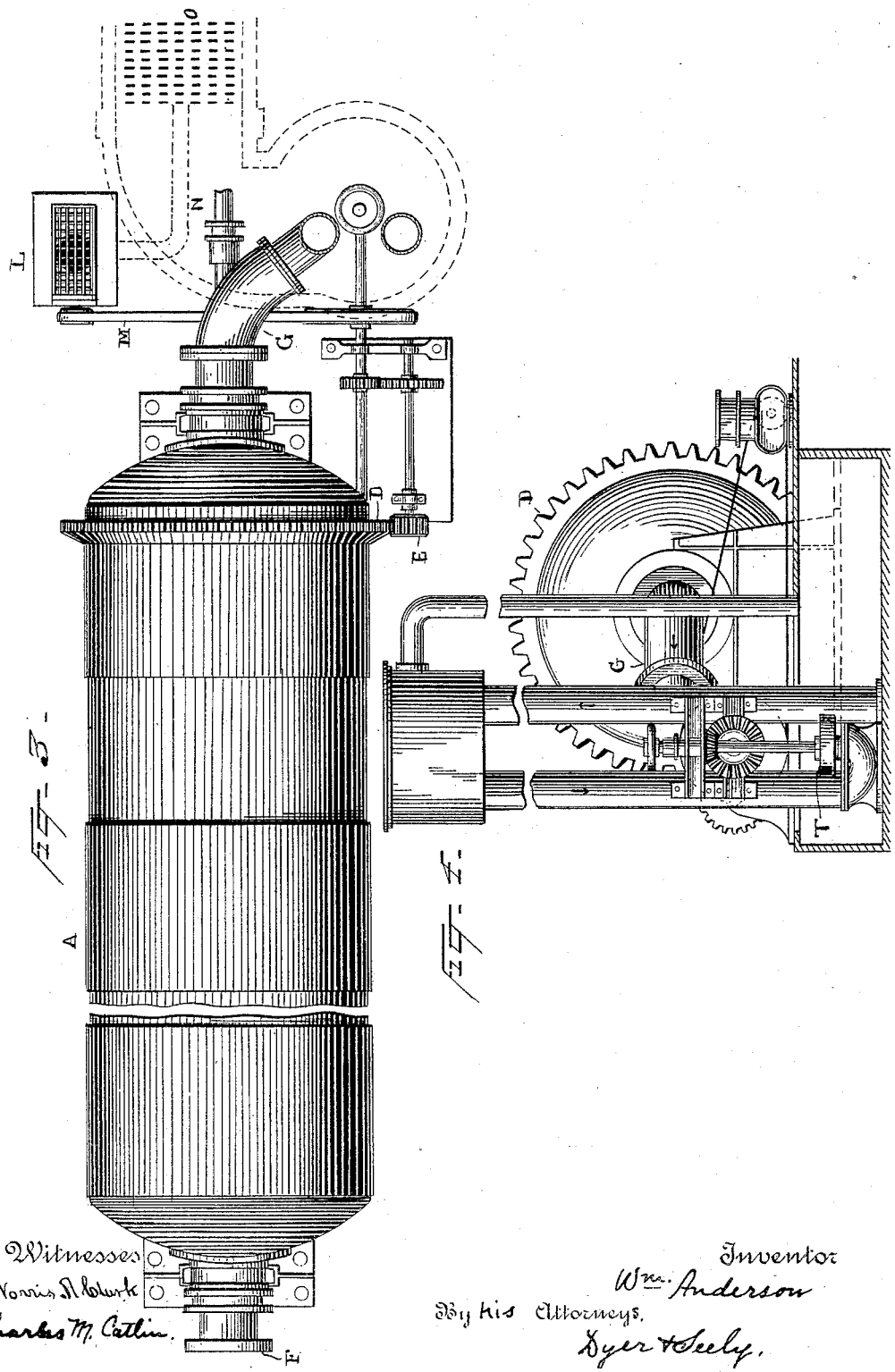

UNITED STATES PATENT OFFICE.

WILLIAM ANDERSON, OF ERITH, ASSIGNOR TO THE REVOLVING PURIFIER COMPANY, LIMITED, OF LONDON, ENGLAND.

APPARATUS FOR PURIFYING WATER.

SPECIFICATION forming part of Letters Patent No. 444,772, dated January 13, 1891.

Application filed April 25, 1890. Serial No. 349,482. (No model.)

*To all whom it may concern:*

Be it known that I, WILLIAM ANDERSON, of Erith, county of Kent, England, and a subject of the Queen of Great Britain, have invented an Improved Revolving Water-Purifier, (Case B,) of which the following is a specification.

My invention relates to apparatus for purifying water by bringing it into intimate contact with spongy iron, iron filings, particles, or other purifying material, as fully set forth in an application filed by me of even date herewith.

The revolving purifier hereinafter described and claimed constitutes an improvement on the purifier patented by me in United States Patent No. 322,148, July 14, 1885.

In the accompanying drawings, which illustrate my invention, Figure 1 is a longitudinal section. Fig. 2 is a cross-section at right angles thereto of apparatus embodying my invention. Fig. 3 is a plan view of the purifier, illustrating the preferred mechanism for driving the same and provided with a blower adjacent to the water-outlet; and Fig. 4 is an end view of the same.

The revolving cylinder A or chamber of other shape is made up, preferably, in sections, as indicated in the drawings. This cylinder is provided at either end with bearings B, resting in suitable journals C. On the cylinder near one end is provided a ring D with gear-teeth, by means of which, together with a pinion E driven by suitable power, the cylinder is rotated.

F is the water-inlet, and G the water-outlet. Around the outlet I place a hood H, the purpose of which is to prevent the iron or purifying material passing out with the water. This hood is provided with a roof-shaped top, as shown in the drawings, to shed the purifying material which falls thereon, and thereby prevent an accumulation of the material in a position where it would be useless.

I is a perforated air-pipe passing into the cylinder through the bearing and supported by suitable braces J.

K is an air-valve, having a weighted arm K', which holds the valve in one position. When the valve is at the top of the cylinder, as shown in the drawings, the passage therethrough is open and superfluous air can escape from the cylinder; but when by the revolving of the cylinder the valve is moved downward, it is closed before it gets below the level of the liquid in the cylinder. On the inner face of the cylinder are placed a series of shelves $A^2$, preferably short, and arranged in echelon, since by this arrangement the strain on the driving mechanism is made more uniform. I also provide a series of still shorter shelves A', set at a slight angle to the length of the cylinder, and arranged in echelon for the purpose of counteracting the tendency of the moving water to carry the iron forward, as set forth in my patent above referred to.

My preferred form of propelling mechanism for the cylinder is shown in Figs. 3 and 4, and consists of a water-wheel driven by the current of water passing through the apparatus and being treated therein. The wheel I have chosen to illustrate is a reaction-wheel T, located in the outlet-pipe G, and is connected by suitable gearing or other transmitting device to the cylinder, as shown. This arrangement has the advantage of being automatic, the purifier commencing to revolve as soon as water is pumped or flows through it. I do not confine myself to the use of this wheel, as other forms may be readily substituted without departing from my invention, and said wheel may be placed in the inlet instead of the outlet pipe. It is sometimes found advisable to aerate the water more thoroughly than can readily be done by means of perforated pipe I, above described. This is accomplished by means of a blower L, driven by the same water-wheel that drives the cylinder, through the medium of belt M. From the blower a pipe N is led to a section of the trough through which the water flows on its way to the settling-tanks or filter-beds, which section is provided with a false bottom O, composed of sheets of zinc finely perforated. The air from the blower rises through this bottom or some equivalent device and mixes with the flowing water. The perforated pipe alone or the blower alone is an efficient aerator, but when used together accomplish the desired result more perfectly.

The operation of this apparatus is as follows: A suitable quantity of purifying material is placed along the bottom of the cylinder. The cylinder is revolved and water admitted at F. At the same time the valve in pipe I is opened, admitting air or other suitable gas. The revolution of the cylinder raises the purifying material and showers the same down through the water, thereby producing intimate contact, and by friction of the particles among themselves keeping them bright and in an active condition. The air escaping from pipe I also permeates the water. By this operation more or less of the iron is dissolved by chemical action with the impurities contained in the water, and by the aeration the iron salt immediately begins to change into insoluble ferric oxide. In addition to the air-pipe shown one may be placed in the pipe leading from the cylinder, if found necessary.

After passing through this apparatus the water is preferably led to settling-tanks or sand-filters, or both, as desired, and then to the point of consumption.

Having thus described my apparatus, what I claim is—

1. The combination, in a water-purifier, of a revolving chamber having an inlet for the water to be treated at one end and an outlet therefor at the other end, shelves on the inner face of the chamber for raising purifying material contained therein, and an air-pipe extending into said chamber, substantially as described.

2. The combination, in a water-purifying apparatus, of a revolving cylinder having an outlet for the water to be treated at one end and an outlet therefor at the other end, an air-pipe extending into said cylinder, and a blower with a pipe or air-passage leading therefrom to the water, substantially as described.

3. The combination, in a water-purifying apparatus, of a revolving chamber having a water-inlet at one end and an outlet at the opposite end, and an air-blower having a pipe or passage communicating with the water, substantially as described.

4. The combination, in a water-purifying system, of the revolving purifier having water inlet and outlet pipes, and a water-wheel in the path of the current flowing through said cylinder, geared to the drum, substantially as described.

5. The combination, in a water-purifying system, of the revolving purifying-cylinder having water inlet and outlet pipes, and a water-wheel in the path of the current flowing through said cylinder, geared to the drum and to an aerating blower, said blower having an air-pipe communicating with the water, substantially as described.

6. The combination, in a water-purifying system, of the revolving purifying-cylinder having water inlet and outlet, and a blower with a pipe leading therefrom to a section of the water-channel, having a perforated bottom, substantially as described.

7. The combination, in a water-purifier, of a revolving cylinder containing purifying material and having an inlet for the water to be treated at one end and an outlet therefor at the other end, and a series of shelves arranged in echelon on the inner face of the cylinder, substantially as described.

8. The combination, in a water-purifier, of a revolving cylinder containing purifying material and having an inlet for the water to be treated at one end and an outlet therefor at the other end, and a series of short shelves at an angle with the length of the cylinder and arranged in echelon on the inner face of the cylinder, substantially as described.

9. The combination of a water-purifier containing iron, means for showering the iron through the water, and an air or gas pipe extending into said purifier, substantially as described.

This specification signed and witnessed this 14th day of February, 1890.

WILLIAM ANDERSON.

Witnesses:
   FRANCIS W. FRIGOUT,
   OLIVER R. JOHNSON,
*Consulate General, U. S. A., at London.*

It is hereby certified that in Letters Patent No. 444,772, granted January 13, 1891, upon the application of William Anderson, of Erith, county of Kent, England, for an improvement in "Apparatus for Purifying Water," an error appears in the printed specification requiring correction, as follows: In line 38, page 2, the word "outlet" should read *inlet;* and that the Letters Patent should be read with this correction therein that the same may conform to the record of the case in the Patent Office.

Signed, countersigned, and sealed this 27th day of January A. D. 1891.

[SEAL.]
               CYRUS BUSSEY,
               *Assistant Secretary of the Interior.*

Countersigned:
 C. E. MITCHELL,
  *Commissioner of Patents.*